(12) United States Patent
Stornes (10) Patent No.: US 6,322,705 B1
(45) Date of Patent: Nov. 27, 2001

(54) METHOD AND A DEVICE FOR THE PURIFICATION OF FLUIDS

(75) Inventor: Svein Olav Stornes, Nærbø (NO)

(73) Assignee: RC EnWa A/S (NO)

( * ) Notice: Subject to any disclaimer, the term of this patent is extended or adjusted under 35 U.S.C. 154(b) by 0 days.

(21) Appl. No.: 09/194,901
(22) PCT Filed: Jun. 2, 1997
(86) PCT No.: PCT/NO97/00137
§ 371 Date: Nov. 1, 1999
§ 102(e) Date: Nov. 1, 1999
(87) PCT Pub. No.: WO97/46493
PCT Pub. Date: Dec. 11, 1997

(30) Foreign Application Priority Data

Jun. 7, 1996 (NO) .................................................. 962428

(51) Int. Cl.[7] .................................................. C02F 9/00
(52) U.S. Cl. .................. 210/669; 210/678; 210/793; 210/807; 210/85; 210/90; 210/275; 210/290
(58) Field of Search .................. 210/669, 805, 210/806, 807, 90, 103, 167, 290, 663, 678, 793, 85, 275

(56) References Cited

U.S. PATENT DOCUMENTS

| | | | | |
|---|---|---|---|---|
| 293,745 | * | 2/1884 | Hyatt ................................... | 210/290 |
| 3,870,033 | * | 3/1975 | Faylor et al. ........................ | 210/167 |
| 3,985,648 | * | 10/1976 | Casolo ................................. | 210/669 |
| 4,322,299 | * | 3/1982 | Scholten et al. ..................... | 210/290 |

\* cited by examiner

Primary Examiner—Ivars Cintins
(74) Attorney, Agent, or Firm—D. Peter Hochberg; Katherine R. Vieyra; William H. Holt (57) ABSTRACT

A water-based heating or cooling plant incorporating a filtration device and a pipeline network for bleeding water from the heating or cooling plant to the filtration device, the filtration network for bleeding water from the heating or cooling plant to the filtration device, the filtration device having a tank with an upright column of horizontal layers of granulated filtration materials, the densities in the layers increasing from the layer at the top downwardly to the most dense bottom layer, at least one layer being a mechanical layer and at least one layer having a chemically active material to increase the pH value of the water to a magnitude exceeding neutral. The invention includes a method for operating the plant and for backwashing the granulated filtration material.

9 Claims, 4 Drawing Sheets

METHOD AND A DEVICE FOR THE PURIFICATION OF FLUIDS

BACKGROUND OF THE INVENTION

1. Field of the Invention

The present invention relates to a method and a device for the purification of fluids, especially water, which is part of, among other things, closed and open water-based heating and cooling plants, ice water plants, district heating plants, heat recovery plants, open cooling towers, etc., by preferably continuous partial flow filtration. The method and fluid purification device according to the invention also include the purification of new fluid for the water-based heating/cooling plant etc., before supplying or recharging into the plant in question, and also the purification of filtering media and possible other media which are comprised by the fluid filtration device.

2. Description of the Prior Art

The knowledge of water treatment is a highly specialized science, in which the effort, in Norway, has been concentrated mainly on securing the intake and transport of consumption water to the consumers. The requirements to quality and properties of water have until the last 5–6 years been connected to medical conditions, including the use of chlorine to inactivate harmful bacteria, micro organisms etc. Only in the recent years parameters like alkalinity, calcium content and pH have been thought to be of major importance. Norway is one of the few European countries in which so-called surface water is used, that is water from open resources like dams, tarns, brooks, inland water, lakes or similar. This water type is very poor in dissolved minerals, metals and salts. The water type has a low electric conductivity, normal pH value of 4–6, i.e. acid surplus, and is characterized as soft, i.e. almost without any calcium and magnesium. These are water properties clearly distinguishing surface water form the properties of groundwater which, among other things, is richer in minerals.

As carrier of energy, carrier of thermal energy—heat or cold carrier—water has a series of properties making it unique in the field of chemistry.

As know, water can be found in three different phases: as ice, in the form of liquid and in the form of gas (as vapour). In the liquid state not other liquid has a greater ability and capacity of absorbing, retaining and emitting thermal energy.

In the earliest centrally heated heating plants there was no use of centrifugal pumps, the introduction of which reduced the installation investments, which made central heating and water-based energy transfer more easily available to a considerably larger amount of consumers than before.

A number of serious problems have been encountered in water-based heating plants, cooling towers etc. In countries having water sources based on ground water sedimentation problems quickly developed in closed heating systems, which resulted in a great increase in the consumption of energy. Internal sedimentation from ground water mainly consists of lime (calcium) and magnesium, which is kept dissolved in the water as long as the content of aggressive carbonic acid is sufficient. However, this carbonic acid content is reduced as the ground water is being pumped to the surface, and by heating, whereby the lime and the magnesium passes from the dissolved to the solid state, followed by desimentation on the hottest surfaces. Such sedimentation results in greatly reduced heat transfer capacity in for example the boiler of a heating plant, which may have serious consequences: increased energy consumption to operate the plant, possible production interruptions, and a risk of destruction of material and accidents among the staff.

These sedimentation/deposit problems were sought to be solved by reducing the pH value to thereby keep said minerals in the dissolved state. However, this required the use of very low pH values, so that in stead substantial acidic corrosion problems arose.

However, the introduction of phosphorus compounds very effectively solved the sedimentation problems by keeping calcium and magnesium in the dissolved state in a wide temperature range, without introducing other problems such as deposits or corrosion in the plant. The use of these phosphorus compounds quickly become so commonly used that, also in countries having surface water of low pH value, these additives were added uncritically to water for heating/cooling plants, without the water first being submitted to a detailed examination or chemical analysis to prove the need for such additives.

A conventional heating/cooling plant etc. has an outer piping circuit which together with the plant form a closed loop and in which a circulation pump is connected in a well known manner. A partial flow of the water circulating in the heating/cooling plant and in the outer circuit, is drawn from the circuit at a bleeding point in the pipe circuit, and is lead through a further pipe, having an in-line shut-off valve, to a filtration housing containing a filter mass for mechanical filtration of the water, which thereafter, possibly together with recharge water, is returned to the circuit through a return pipe with a control valve. The filter mass in the filtration housing must be replaced frequently. The filtration effect is not very satisfactory, both in terms of quality and quantity.

SUMMARY OF THE INVENTION

The present invention present respectively an improved filtration method and filtration device for qualitatively and quantitatively satisfactory water treatment in connection with water-based heating/cooling plants etc., among others of the initially mentioned kinds and similar kind, and in which the properties of the water after treatment/filtration and the heating/cooling plant components exposed to the treated/filtered water, distinguish themselves by: eliminated/minimized corrosion including galvanic corrosion; sludge, corrosion particles and other corrosion products being removed by filtration from the circulating amount of water (by partial flow filtration, known in itself): and; any aggressive carbonic acid present being eliminated. This results in, among other things, the following technical advantages: the efficient of the open/closed water-based heating/cooling plants is optimized; the effect of control valves is optimized; the water circulation increases and circulation pumps meet less resistance.

For surface water two parameters are analyzed; pH value and alkalinity. The values obtained are inserted into a diagram to decide whether the water will corrode steel, iron and stainless steel. From this diagram (curve) may be read, which values will have to be altered to avoid corrosion of iron. Another diagram shown the pH-related aggressive properties of the water toward copper. The two diagrams indicate that pH-values between 8.6 and 9.5 should be aimed at, to reduce the aggressiveness of the water toward the above metals. A third diagram shows simple ways of removing/reducing the solid particle content of the water. Experience by users at more than 100 plants has provided sensational results. By selecting suitable filters, considerable amounts of solid mass were removed through filtration.

However, there is a need for a complete solution to water treatment/filtration at said cooling/heating plants etc.; comprising:

i) Chemical alteration of the aggressive properties of the water towards the metals being part of the components in water-based heating, cooling, heat recovery and ice water plants;

ii) Separation of the solid particle content of the water, i.e. sludge, such as corrosion, graphite from steel pipes, oxides, welding slag and any precipitated organic material;

iii) Pre-treatment of dilution water.

In accordance with the present invention, a "filtering device" has been provided width a reactor tank made of a chemically passive material, which may withstand pressure occurring in water-based plants, for example of 0–12 bar. The dimensions of the tank have been accurately adapted to the chemical reactions which are necessary to deactivate the water, and to achieve optimum separation of particle matter. The reactor tank may for example exhibit the following internal measurements: diameter 25.4 cm×height 132 cm, corresponding to a volume of 66 liters. Of course these dimensions constitute a non-limiting example.

The reactor tank, which may have a four-gate manual control valve arranged thereto, for, among other things, the continuous supply of a partial flow of water included as a thermal energy carrier in a cooling/heating plant, is provided, at the top, with a fill opening for the filling up/replenishing with "reaction mass". The reactor tank is filled, in one embodiment, with layers (mainly horizontal layers), from top to bottom, of fine filtration sand, granulated magnesium oxide, granulated calcium carbonate, coarse filtration sand, porcelain isolators, glass spheres or spheres of other chemically inert material (as the bottom layer).

The upper layer consists of chemically neutral granulate in which the filtration mass has a grain size from 0.6 to 1.2 mm. The mass consists of a chemically neutral silicide/aluminum compound. Each filter particle has a highly irregular surface, which means correspondingly great adsorptive power, as the grade of filtration in a typical case will be down towards a size of 20 $\mu$m. This grade is required to enable filtration of the most commonly occurring corrosion and sludge particles. The density of the filter mass is very low.

The second layer form the top consists of granulated magnesium oxide, an the layer immediately below consists of granulated calcium carbonate. Then follows a layer of "coarse" filtration sand, grain size 1–3 mm, and next a lowermost layer but one, consisting of hollow porcelain thimbles, for example of the same type as is used as electric isolators for example for heating conductors, and the lowermost layer in the reactor suitably consists of spherical, smooth glass balls, in a typical case of a diameter of 10–15 mm.

"Raw water" and recharge water is lead into the top of the reactor tank, and possible sediments particles of grain size >20–30 $\mu$m, for example corrosion particles) form in the top layer in the form of the first filter layer. Density: 1.12 kg/liter.

Then, water flowing downward in the upright reactor tank, gets into contact with the underlying, uppermost but one, filter layer, i.e. the second filter layer (the chemically active layer of granulated magnesium oxide, density of 1.34 kg/liter), in which the pH value is upgraded according to the following chemical reaction:

$MgO + H_2O \longrightarrow Mg_{2+} + 2\ OH -$ (OH- increases the pH value).

Then the water gets into contact with the next underlying filter layer, i.e. the third filter layer, serving as "after-polishing" to the second filter layer, that, causes a further increase of the pH value in case the time of contact was insufficient in the above, second filter layer. As mentioned, the third filter layer consists of granulated calcium carbonate, for example in the form of crushed marble ($CaCO_3$).

Here the following chemical reaction takes place:

$CO_2 + H_2O \longrightarrow H_2CO_3$ ( Water which has been exposed to air, always contains some carbon dioxide, whereby carbonic acid is formed, a weak acid which can dissolve calcium carbonate.)

$CaCO_3 + H_2CO_3 = Ca +++ 2HCO_3$ - ($HCO_3$ increases the pH)

The density of the filter mass of the third filter layer is 1.48 kg/liter.

The coarse filter sand of the fourth layer (from the top) in the reactor tank only serves as a support layer and isolates chemically active filter mass of the above layer from the chemically inactive filter masses of the two underlying layers, the fifth and the sixth layers. The density of the coarse filtration sand or similar material is 1.55 kg/liter.

Figure 2:
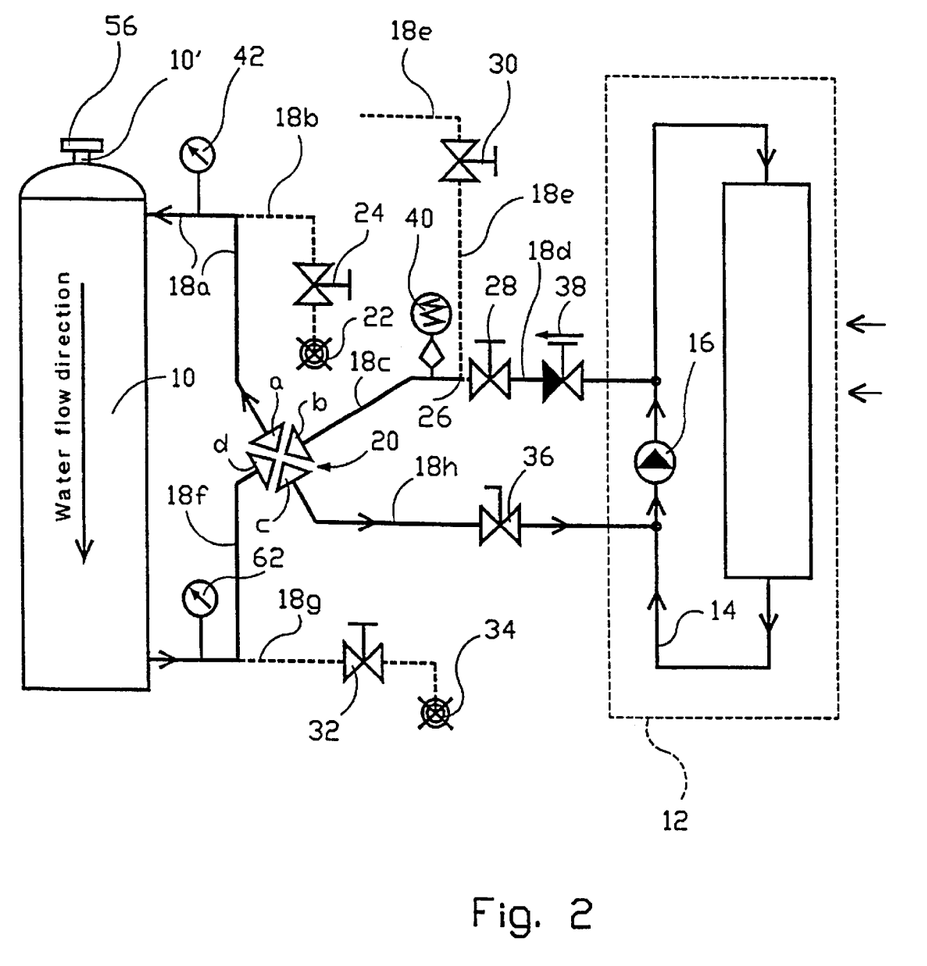
FIG. 2 showing the system during ordinary operation.
Figure 3:
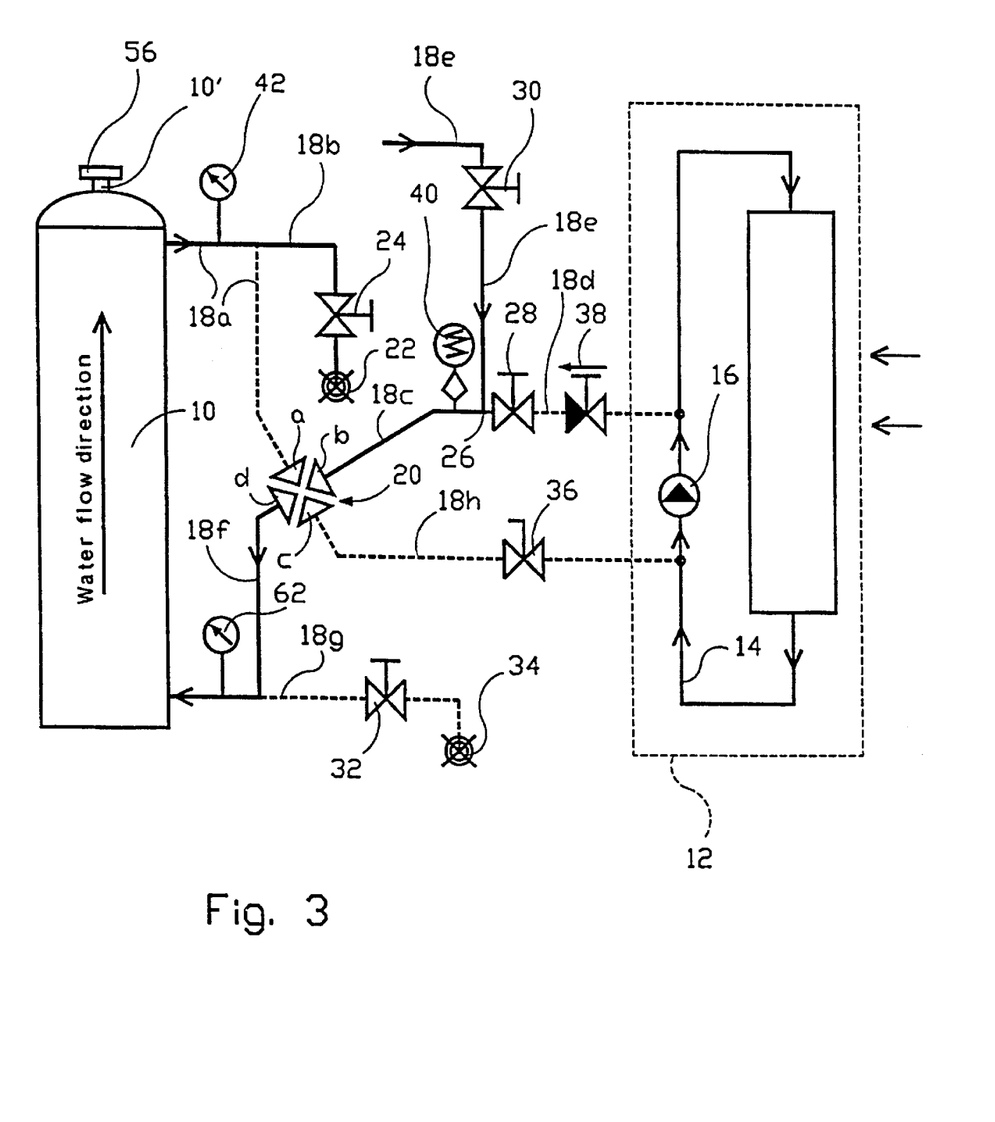
FIG. 3 showing the system during backwashing of filtration and reaction media.

The penultimate, and the lowermost layer, corresponding to the fifth and the sixth layers, consist respectively of for example hollow porcelain thimbles and glass spheres. Both these layers of chemically indifferent materials are intended to create chemically neutral surroundings for a zinc electrode, described below, and both these layers have a higher density than the materials of the other layers; density of porcelain: 1.82 kg/liter, density of glass balls: 2.30 kg/liter, Further aims, advantages and features of the method and device according to the invention, are explained in detail in the following detailed description with reference to the accompanying schematic drawings, in which FIGS. 1–3 show the same circuit diagram of the reactor tank connected in a pipe system provided with valves, and with one branch connected to an outer circulation circuit having a circulation pump for a water-based plant, in which the reactor tank of said pipe system has a control valve in the form of a four-way valve arranged thereto, FIG. 1 showing the system in a state, in which dilution water is supplied to the reactor tank for the water-based plant;

The at anytime water-conveying pipelines are drawn in full-drawn lines as opposed to the at the same time not water-conveying pipelines, whose mutual connectability through valves will clearly appear from the following description.

Figure 1:
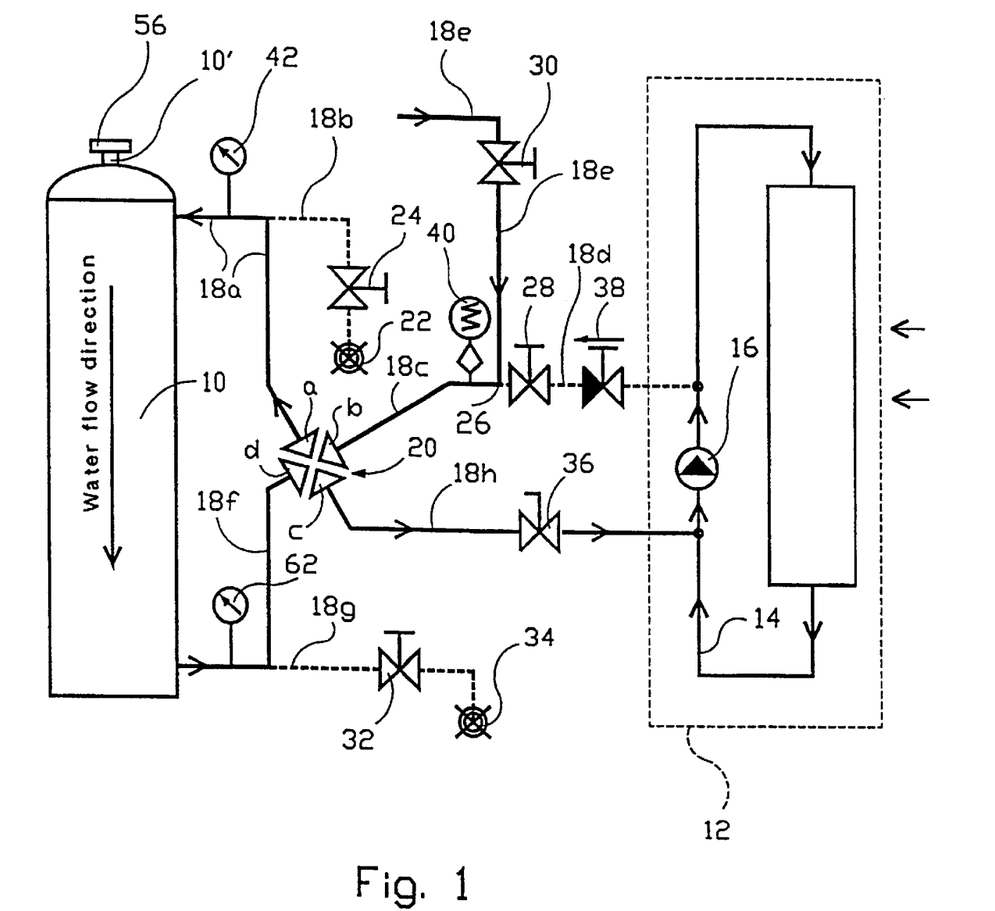

Referring first to FIG. 1 showing the plant in the state, which is adopted by, among other things, the pipeline connections on filling up and/or replenishing the heating/cooling plant with water via the filtration and reaction device in the form of an upright tank which is designated by the reference numeral 10, shown on a larger scale and in closer detail in FIG. 4, and which will be described later.

A water-based plant 12 is shown in the form of a dotted-line block, and has, in a manner known in in the art, an outer pipeline circuit 14 which, together with the plant 12, form a closed water circulation loop. In the outer circuit 14 is connected a circulation pump 16, the flow direction of the water being indicated by arrows in the outer circuit 14.

Between the water-based plant 12, 14 and the filtration and reaction device 10 extend various pipeline sections which may be connected, disconnected, shut off, opened etc. by means of valves.

A first pipeline section 18a leads from the upper portion of the reactor tank partly to a four-way valve 20 and partly to a drain 22 for water in the upper part of the reactor tank 10 via a second pipeline section 18b, in which a shut-off valve 24 is shut in the case according to FIG. 1. Through the four-way valve 20 the first pipeline section 18a communicates with a third pipeline section 18c, which at a point 26 may be connected to either a fourth pipeline section 18d, which is shut here by means of a shut-off valve 28, but which is connected to the outer circuit 14 of the water-based plant 12, or to a fifth pipeline section 18e which in the case according to FIG. 1 has an open shut-off valve 30, and which is connected to a source of dilution water.

A sixth pipeline section 18f connected to the lower portion of the reactor tank, leads partly to the four-way valve 20 and partly, via a seventh pipeline section 18g having a closed shut-off valve 32, to a drain 34 for water in the lower area of the reactor tank 10.

Via the four-way valve 20 the sixth pipeline section 18f is in liquid communication with an eight pipeline section 18h, which is provided with a regulating valve 36 and is connected to the outer circulation circuit 14 of the water-based plant 12.

The water-conveying pipelines according to FIG. 1 are thus formed, on the one hand, by the sixth and the eighth pipeline sections 18f, 18h, in which the flow direction of the water, indicated by arrows in broad lines, representing these connected, water-conveying pipeline sections, is from the reactor tank 10 to the water-based plant 12, upstream of the circulation pump 16 in the outer circulation circuit 14, and, on the other hand, by the first, third and fifth pipeline sections 18a, 18c and 18e whose water flow direction is from said water source (not shown) to the upper area of the reactor tank.

The regulating valve 36 in the pipeline section 18h shall in the state of the system according to FIG. 1 be adjusted as during ordinary operation.

In the fourth pipeline section 18d there is, besides the shut-off valve 28, connected a check valve 38. The valve 28 shall normally effect a shut-off during the filling up/replenishing with untreated "raw water". The check valve 38 thus serves as an extra guard against untreated raw water being filled directly into the water-based plant 12, 14.

For filing up and replenishing the water-based plant 12, 14, water from a hot water supply is preferably used, so as to to minimize the oxygen content, but, of course, cold water supply may be used instead. The pipeline sections conveying untreated raw water are according to FIG. 1: 18e,18c and 18a. This raw water passes the shut-off valve 30 which has the function of a fill cock. By a water meter 40 arranged to the pipeline section 18c the amount of water passing the valve 30 may be observed. Untreated raw water from the pipeline section 18 c is lead into the four-gate control valve 20 of the filtration and reaction device 10, in which the gates a and b on the one side, and c and d on the other side are connected. On its way into the upper portion of the reactor tank 10 the raw water passes a first pressure gauge 42 in the first pipeline section 18a, and this indicates the input pressure on the filtration and reaction tank.

Figure 4:
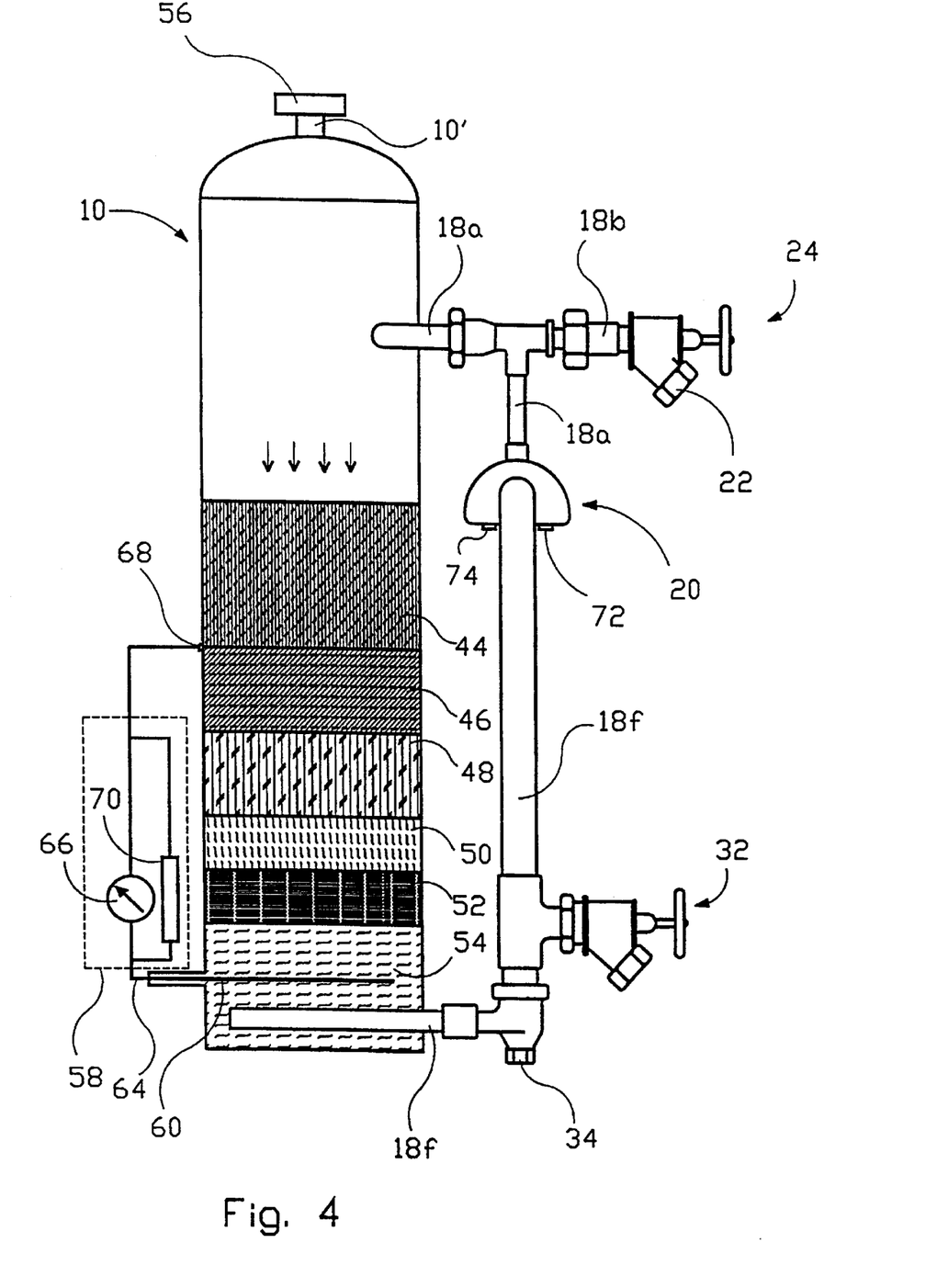
FIG. 4 is a schematic vertical cross section of the upright reactor tank, showing the different layers and immediately adjacent, associated equipment, among other things pipe couplings, said four-way valve, etc.

At this state of the water treatment/filtration process, reference is made to FIG. 4, which shows a vertical cross-section through the reactor tank 10 and its individual layers placed on top of each other, comprising, mentioned form the top: an upper mechanical filtration layer 44 of fine filtration sand, and a next thereto underlying pH-upgrading layer 46 of granulated magnesium oxide, a possible next underlying pH-upgrading layer 48 of granulated calcium carbonate, and a next thereto underlying mechanical filtration layer 50 which primarily serves to separate the chemically active layers 46, 48 from the two lowermost layers 52 and 54 of chemically inactive substances, porcelain thimbles and glass balls, respectively. For all six layers a detailed description as to grain sizes, sizes, densities etc. has been given earlier. Likewise, it has been described and explained what the water, under treatment, is subjected to, in terms of mechanical filtration (particularly in the uppermost layer of the fine sand 44) and chemical action in the layers 46 and 48, particularly by increasing the pH value. At the top the reactor tank 10 has an upwards open neck portion 10' with a cap in the from of a so-called top-screw 56 for filling up/replenishing with reaction mass (in the layers 46 and 48).

The water-flow direction in the reactor tank 10 is from the top downwards in FIGS. 1, 2, and 4, see arrows. The water treatment process itself in the rector tank 10 takes place "downstream", as solid particles deposit in particular in the layer 44, but also in the layers 50, 52 and 54, pH value and alkalinity being regulated by passing through the chemically active layers 46 and 48 before the treated water passes a corrosion indicator 58 whose corrosion electrode 60 is placed in the lower end of the reactor tank 10 itself.

The treated water passes a second pressure gauge 62 in the pipeline secant 18f which leads from the bottom of the tank 10 the gate d of the control valve 20 and out through gate c to the pipeline section 18h, which is connected, via the regulation valve 36, to the water-based plant 12, 14, upstream of the centrifugal pump 16. For a reactor tank of an external diameter of 25,4 cm and a total height of 134 cm, the regulating valve 36 should be adjusted corresponding to a water supply rate of approx. 12 liters/min. In typical applications this gives an approximate time of contact between raw water and water filtration/treatment media of about 5 minutes, which has proved to yield highly satisfactory results. Larger amounts of water per time unit may easily be obtained by increasing the physical dimensions of the filtration and reaction device.

Here, reference is made to FIG. 2, which illustrates treatment of the water of the water-based plant during normal operation of the plant.

the filtration and reaction device according to the invention, as well as the procedure for the treatment of water, according to the invention, are based on an at all times (normal operation) continuous treatment of a percentage of the total amount of water circulating in the water-based plant (normally the plants shall be adjusted to 10–15 % of the yield of the circulation pump 16).

Water which is part of the water-based plant 12, 14, and which is to be treated in the filtration and reaction tank 10, is drawn as a partial flow, in a manner known in itself, by opening the shut-off valve 28 in the pipeline section 18d, and passes the water meter 40 before entering gate b of the four-gate, three-position control valve 20, which is now connected by manual operation of control valve 20 to the first pipeline section 18a, which by way of the first pressure gauge 42 leads to the upper portion of the reactor tank 10, in exactly the same way and with the same water direction from the top downwards as in the treatment of raw water according to FIG. 1. Used water from the water-based plant 12, 14, which is continuously being transferred in the form a partial flow, to the upper area of the reactor tank 10, and successively flows through the filtration layers and chemical reaction layers therein, is subjected to the following filtration/chemical effect: In the top layer 44 (fine sand) solid particles, corrosion, graphite sludge etc. down to 20 $\mu$m are removed by filtration, while the two underlying layers, containing respectively granulated magnesium oxide and granulated calcium carbonate, increase pH and alkalinity to "non-aggressive" values. This water treatment process is visualized through the corrosion indicator mounted on the filtration and reaction tank (10), see FIG. 4.

According to FIG. 2 the treated water flows into gate d of the four-gate control valve 20, which gate d is now connected, by manually operating control valve 20, to gate c, from where the treated water passes through the pipeline section 18*h* to the water-based plant 12,14 via the regulating valve 36, at which the water flow portion for the filtration and reaction device is preset at 10–15% of that of the circulation pump. Theoretically, such a setting will effect a filtration and treatment of the total water volume 2.4 times per 24 hours. The main task of the pressure gauges 42, 62 is to indicate the working pressure of the filtration and reaction device and to indicate head loss. When, after a certain time of operation, depending on the amounts of sludge in the water-based plant, head loss readings exceeding for example values corresponding to a water column of 5 meters are observed, it is time to wash the reaction media in the tank 10 clean of accumulated contaminating materials.

This washing operation takes place in the opposite direction of the water treatment process itself. In this connection reference is made to FIG. 3, which illustrates the filtering and reaction device during this backwash operation.

In known water treatment devices for water-based heating/cooling plants of various kinds, are normally used filter cartridges containing a straining web, a membrane or spun filter material. When the filter material must be discarded, after having been used for some time, the filter cartridges must be replaced.

According to the invention, as opposed to such disposable filter cartridges, is used an accurately balanced combination of granulated mass, in which the mass having the lowest density is placed at the top in the form of a filtration layer 44, after which, in a downward direction, follow the two chemically active layers 46, 48 and the layers 50, 52, and finally is used a distributing/supporting layer 54 downmost in the tank 10, which layer 54 consists of said smooth, spherical glass balls of a density much higher than those of the materials in the layers above.

The object of this mutual arrangement of the individual layers 44, 46, 48, 50, 52 and 54 in the reactor tank 10 has been, among other things, to enable washing clean the filter materials (upper layer 44) as well as the reaction media (second layer 46 from the top and the immediately underlying layer 48) of the reactor tank 10 to remove accumulated sludge and corrosion particles, other contaminating particles and so on.

The reactor tank 10 receives untreated raw water from the so-called "dilution water supply" introduced at the bottom of the tank 10, see FIG. 3, where the pipeline sections 18*e*, 18*c* and 18*f* are connected through shutting the shut-off valve 28 and manually connecting gate b to gate d. The water flow direction (from below/upwards) in the tank 10 is indicated by an arrow.

Untreated rear water passes the water fill cock 30 and then flows via the water meter 40 into gate b of the control valve 20, which gate b is manually connected with gate d for the inflow to the lower area of the reaction tank 10 through pipeline section 18 *f* in which is interposed the second pressure gauge 62.

At this moment the shut-off valve 24 is opened, which valve 24 serves as a drain valve in the second pipeline section 18*b* which is connected to the first pipeline section 18*a*, communication with the top area in the reactor tank 10, and in which the first pressure gauge 42 is connected. At the same time as the valve 24 is opened, the amount of water is observed at the water meter 40 and the adjustable drain valve 24 is adjusted until the prescribed amount of wash water per time unit is achieved.

This amount of wash water per time unit is related to the individual reactor tank embodiments and particularly to their physical dimensions. For an embodiment having the dimensions 24.5×127 cm the amount of wash water per time unit should be adjusted to a minimum of 35 liters/minutes, a maximum of 45 liters/minute.

Normal time for this sequence, the wash sequence is 5 minutes, but by extraordinarily great amounts of sludge collected in the reactor tank 10, it may come into question to somewhat prolong the wash time. On implementing this washing, the shut-off valve 28 is shut in the pipeline section 18*d* which is connected to the water-based plant 12,14 through the check valve 38. The reduction/regulating valve 36 is shut, see FIG. 3.

This washing process, which in the reactor tank 10 takes place from the bottom/upwards, has three functions:

(i) To wash out sludge accumulated in the filtration layers and reaction media layers.

(ii) To cause a 20–30% expansion of the media of the three top layers 44, 46, 48, so that these are "fluidized" within the tank 10, and when the washing is finished, settle in the "stack of layers" according to their densities. This function is important since it might otherwise be found that filter grains form material belonging to the upper layer 44 would follow the water flow (FIG. 2) downwards in the tank 10 during ordinary operation, and something similar might occur for the media in the second layer 46 from the top and the next underlying layer 48. These chemically active media will in time dissolve in the water in the tank 10, and the grain size will then be reduced. Experiments with a transparent tank 10 have proved highly satisfactory results of this function;

(iii) To wash the corrosion electrode 60, FIG. 4 clean of any oxidation or other deposit working as isolation between the electrode 60 and the water under treatment.

According to FIG. 4 the corrosion electrode 60 is ground through an electric cable 64 with an in-line milliampere meter 66 and an grounding clamp 68 attached to the tank material. The corrosion indicator 58 which is provided with a potentiometer 70, serves to prove the wanted chemical processes, i.e. to make it possible to check if the water is aggressive or not aggressive through measuring reduction-oxidation-reactions. By monitoring head loss by means of the pressure gauges 42, 62 it may be observed when washing of foreign matter collected in the filter and reaction media, causing the head loss, should be implemented. This function may possibly be automated.

Filling up/replenishing with reaction masses of the kind constituting the second layer 46 from the top in the embodiment in FIG. 4, and the next underlying layer 48, in time dissolving in the water in the tank 10, is done via the top opening of the tank 10 at the end of the next portion 10', which is normally covered an closed by a top screw 56. In FIG. 4, 72 designates the water inlet of the four-gate control valve 20, while 74 designates the outlet for treated water.

The invention has been described in detail with particular emphasis on the preferred embodiment, but variations and modifications within the spirit and scope of the invention may occur to those skilled in the art to which the invention pertains.

What is claimed is:

1. A method for purification of water flowing in a water-based heating or cooling plant as a circulating liquid thermal energy carrier, said method comprising:

passing water to be filtered through a tank containing filter materials, the filter materials including:

pH changing material for changing the pH value of the water to a value exceeding neutral; and a plurality of layers of different granulated substances, including at least one layer of mechanical filter substances including fine grain sand and at least one layer of chemical reacting filter substances, the chemical reacting filter substances including at least one of granulated magnesium oxide and granulated calcium carbonate; the layers being located in an upright column having a top, said layers of mechanical filter substances and chemical reacting filter substances having respective densities, said layers of filter substances being located in the upright column in reverse order of their densities, the layer of filter substances having the lowest density being located at the top of the column and the remaining layers of filter substances following therebelow in order to density and being in contact with adjacent layer(s), with the layer of filter substances having the highest density being the lowermost layer in the column in the tank, each layer of mechanical filter substances being in direct contact with at least one layer of chemical reacting filter substances;

wherein the step of passing water comprises:

passing the circulating water to be purified through the top of the tank, then through all of the filter substances of said material layers, to subject the circulating water to a combined effect of mechanical and chemical purification treatment, said layers of filter substances accumulating at least one of sludge, corrosion residues and other contaminating particles during the purification treatment; and passing raw water through the column from the bottom of the tank to the top of the tank when the tank needs to be cleaned, for forcing the filter substances to swirl in the tank, and disposing of the raw water from the upper part of the column through a drain, to free said filter substances of sludge, corrosion residues and other contaminating particles accumulated on said substances and to convey the sludge, corrosion reside and other contaminating particles from the tank with used raw water, and stopping the flow of raw water, and allowing the cleaned granulated substances from the filter material layers to settle, wherein the granulated filter substances settle into place to form the column with the substances arranged in reverse order of the respective densities within the tank.

2. A method according to claim 1 wherein the circulating water passed through all of the filter substances has a pH value in the range between 8.6 and 9.5.

3. A filtration device for use with a water-based heating or cooling plant in which water circulates as a liquid carrier of thermal energy, said filtration device being adapted to receive a partial flow of water for filtering water removed from the heating or cooling plant for return to the heating or cooling plant, said filtration device comprising:

an upright filtration and reactor tank having an upper portion, a lower portion, an inlet for untreated water at the upper portion and an outlet for water treated in the filtration device at the lower portion, said tank containing:

an upright column of horizontal layers of filter materials, each layer containing a particular granulated filter substance, said layers having a top layer and other layers positioned beneath and adjacent to the layer above it, said layers comprising at least one mechanical layer and at least one layer of a chemically active material of such properties as to effect an increase of the pH value of the water being treated to a magnitude exceeding neutral and said layers of filter materials having respective densities, said layers being positioned in said upright column in reverse order of their densities, wherein the layer having the lowest density filter material being located at the top of said column, the remaining layers following therebelow in accordance with their densities, said layers being in direct contact with each other, wherein the layer whose material has the highest density is positioned as the lowermost layer in said upright column within said tank; and wherein said upright column of horizontal layers comprises:

a top layer of fine filtration sand of a particle size of 0.6–1.2 mm and having an irregular surface to provide the sand with high adsorptive power;

a second layer from the column top comprising granulated magnesium oxide;

a next underlying layer including coarse filtration sand serving to isolate the chemically active filter materials of overlying layers from underlying layers and the lowest underlying layers comprising chemically inactive material layers containing hollow bodies of porcelain and glass, the hollow porcelain and glass bodies having the highest density.

4. A filtration device according to claim 3, wherein the fine filtration sand of said top layer has a filtration grade of at least 0.1 mm; and wherein said column of horizontal layers further comprises a third layer located below the second layer, said third layer being composed of granulated calcium carbonate.

5. A filtration device according to claim 3, and further including a grounded corrosion electrode connected to an externally arranged corrosion indicator extending into the lower portion of said filtration and reactor tank, said indicator comprising a potentiometer and a milliampere meter.

6. A filtration device according to claim 3 wherein the filtration and reaction tank includes a very top, and a shutable fill opening for the filling up/replenishing at least of chemically active material, is located at the very top.

7. A plant according to the claim 3 wherein the pH value of the water treated in the filtration device has a value in the range between 8.6 and 9.5.

8. A filtration device and a pipeline network for use with a water-based heating or cooling plant in which water circulates as a liquid carrier of thermal energy, said filtration device and pipeline network being adapted to bleed a partial flow of water for filtering water removed from the heating or cooling plant for return to the heating or cooling plant, said filtration device comprising:

an upright filtration and reactor tank having an upper portion, a lower portion, an inlet for untreated water at the upper portion and an outlet for water treated in the filtration device at the lower portion, said tank containing:

an upright column of horizontal layers of filter materials, each layer containing a particular granulated filter substance, said layers having a top layer and other layers positioned beneath and adjacent to the layer above it, said layers comprising at least one mechanical layer and at least one layer of a chemically active material of such properties as to effect an increase of the pH value of the water being treat to a magnitude exceeding neutral and said layers of filter materials having respective densities, said layers being positioned in said upright column in reverse order of their densities, wherein the layer having the lowest density filter material being located at the top of said column, the remaining layers following therebelow in accordance with their densities, said layers being in direct contact with each other, wherein the layer whose material has the highest density is positioned as the lowermost layer in said upright column within said tank; and wherein said upright column of horizontal layers comprises:

a top layer of fine filtration sand of a particle size of 0.6–1.2 mm and having an irregular surface to provide the sand with high adsorptive power;

a second layer from the column top comprising granulated magnesium oxide;

a next underlying layer including coarse filtration sand serving to isolate the chemically active filter materials of overlying layer from underlying layers; and the lowest underlying layers comprising chemically inactive material layers containing hollow bodies of porcelain and glass, the hollow porcelain and glass bodies having the highest density; and said pipeline network comprising:

a manually operable four-gate/three position control valve, said valve having gates connected in pairs, through which gates water is flowable, said gates including gate a, gate b, gate c and gate d; said network having a first water line going form gate a to the upper area of the filtration device, a second water line going from the raw water source and having a first shut-off valve, a third water line going from the downstream side from the first shut-off valve of the second water line to gate b, a fourth water line going from the purification and treatment plant to the third water line and having a second shut-off valve for bleeding water from the plant to be filtered in the filtration device, a fifth water line going from the lower area of the filtration device to gate d, a sixth water line going from gate c to the plant and having a regulating valve for returning filtered water to the plant, and a seventh water line going from the upper area of the tank to a drain and having a third shut-off valve;

said filtration and reactor tank and the network having the following connections for the respective operations of said plant: (i) for regular operation: gate a being connected to gate b, and gate d connected to gate c, to establish water flow from the water-based plant to the upper area in the tank, and flow of treated water from the lower area in the tank back to the water-based plant; (ii) during filling up/replenishing the water-based plant with dilution water, after treatment in the filtration and reactor tank: gate a being connected to gate b, and gate d to c, the first shut-off valve being opened and the second shut-off valve being closed to effect the flow of raw water to gate b, and (iii) for washing the granulated materials of the individual layers in the tank, gate b being connected to gate d for the supply of untreated raw water to the lower area of the tank, the first shut-off valve and the third shut-off valve being opened to enable raw water flow from the upper area of the tank towards a drain, and gate a being connected to gate c, the regulating valve being closed to shut the water flow path from gate a to the plant.

9. A filtration device and pipeline network according to claim 8 wherein the filtration and reactor tank has an inlet/outlet at the upper part of the tank and an outlet/inlet at the lower part of the tank, and the pipeline network has a line going into the inlet/outlet and a line going to the outlet/inlet, wherein the pipeline network further includes pressure gauges in the line going to the inlet/outlet and in the line going to the outlet/inlet.

* * * * *